United States Patent
Henderson et al.

(10) Patent No.: US 11,039,507 B2
(45) Date of Patent: Jun. 15, 2021

(54) METHOD OF BRAZING A TREATMENT AREA OF A LOAD-BEARING COMPONENT

(71) Applicant: GENERAL ELECTRIC COMPANY, Schenectady, NY (US)

(72) Inventors: Brian Leslie Henderson, Simpsonville, SC (US); Yan Cui, Greer, SC (US); Daniel James Dorriety, Travelers Rest, SC (US); Gary Charles Shubert, Woodruff, SC (US); Paul Albert Cook, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 811 days.

(21) Appl. No.: 15/440,492

(22) Filed: Feb. 23, 2017

(65) Prior Publication Data

US 2018/0242405 A1    Aug. 23, 2018

(51) Int. Cl.
*H05B 6/10*  (2006.01)
*H05B 6/40*  (2006.01)
(Continued)

(52) U.S. Cl.
CPC ............. *H05B 6/101* (2013.01); *B23K 1/002* (2013.01); *B23K 1/0018* (2013.01); *B23K 1/19* (2013.01); *B23P 6/002* (2013.01); *F01D 5/005* (2013.01); *H05B 6/40* (2013.01); *B23K 2101/001* (2018.08); *B23K 2103/05* (2018.08); *B23P 6/007* (2013.01)

(58) Field of Classification Search
CPC ........ B23K 1/0018; B23K 1/002; B23K 1/19; B23K 2101/001; B23K 2103/05; B23P 6/002; B23P 6/007; F01D 5/005; H05B 6/101; H05B 6/40

USPC ......... 219/615; 416/224; 29/402.07, 402.13, 29/889.1, 889.7; 228/119
See application file for complete search history.

(56) References Cited

U.S. PATENT DOCUMENTS 4,934,583 A * 6/1990 Patsfall ................. B23K 20/00
                                                        228/119
5,033,938 A * 7/1991 Fraser .................... B23P 6/005
                                                        228/119
(Continued)

FOREIGN PATENT DOCUMENTS

EP         2 087 961 A1    8/2009
WO      2013/066671 A1    5/2013

OTHER PUBLICATIONS

Extended European Search Report and Opinion issued in connection with corresponding EP Application No. 18155149.0 dated Jul. 31, 2018.

*Primary Examiner* — Dana Ross
*Assistant Examiner* — Ket D Dang
(74) *Attorney, Agent, or Firm* — McNees Wallace & Nurick LLC (57) ABSTRACT

A method of brazing a treatment area of a load-bearing component includes applying a repair material over the treatment area of the component and positioning an induction brazing coil having a geometry corresponding to the treatment area over the repair material and the treatment area. The method further includes heating the repair material utilizing the induction brazing coil to a temperature sufficient to cause at least partial melting of the repair material, thereby effecting a brazed joint between the treatment area and the repair material.

20 Claims, 5 Drawing Sheets

(51) Int. Cl.
   *B23K 1/002*    (2006.01)
   *B23K 1/00*     (2006.01)
   *F01D 5/00*     (2006.01)
   *B23K 1/19*     (2006.01)
   *B23P 6/00*     (2006.01)
   *B23K 101/00*   (2006.01)
   *B23K 103/04*   (2006.01)

(56) References Cited

U.S. PATENT DOCUMENTS

| | | | | |
|---|---|---|---|---|
| 5,902,507 A * | 5/1999 | Wiezbowski | ......... | B23K 1/002 219/615 |
| 6,333,494 B1 * | 12/2001 | Fischer | ......... | B23K 1/002 219/615 |
| 8,703,044 B2 | 4/2014 | Sathian et al. | | |
| 2006/0042729 A1 * | 3/2006 | Kottilingam | ......... | C22F 1/10 148/675 |
| 2009/0127254 A1 * | 5/2009 | Bamberg | ......... | H05B 6/36 219/672 |
| 2009/0179064 A1 * | 7/2009 | Lee | ......... | B23K 3/087 228/41 |
| 2010/0237054 A1 * | 9/2010 | Seegmiller | ......... | H05B 6/14 219/201 |
| 2011/0259876 A1 | 10/2011 | Breznak | | |
| 2013/0048015 A1 * | 2/2013 | Mantkowski | ......... | B23K 1/206 134/2 |
| 2013/0270259 A1 * | 10/2013 | Nebelung | ......... | B23K 13/01 219/617 |
| 2014/0097159 A1 | 4/2014 | Belnap et al. | | |
| 2014/0308117 A1 | 10/2014 | Daniels et al. | | |
| 2014/0356056 A1 * | 12/2014 | Xie | ......... | B23K 1/005 403/272 |
| 2015/0307978 A1 * | 10/2015 | Levy | ......... | B05B 12/20 427/8 |
| 2016/0339544 A1 * | 11/2016 | Xu | ......... | B23K 35/3033 |

\* cited by examiner

METHOD OF BRAZING A TREATMENT AREA OF A LOAD-BEARING COMPONENT

FIELD OF THE INVENTION

The present invention is directed to a method of brazing a treatment area of a component. More particularly, the present invention is directed to a method of brazing a treatment area of a load-bearing component.

BACKGROUND OF THE INVENTION

Certain load bearing components, such as gas turbine components operate at high temperatures and under harsh conditions, which, over time require maintenance. Conventionally, even relatively simple repairs typically require placing the entire gas turbine component in a furnace, which is expensive and time-consuming.

BRIEF DESCRIPTION OF THE INVENTION

In an exemplary embodiment, a method of brazing a treatment area of a load-bearing component, including applying a repair material over the treatment area of the component and positioning an induction brazing coil having a geometry corresponding to the treatment area over the repair material and the treatment area. The method further includes heating the repair material utilizing the induction brazing coil to a temperature sufficient to cause at least partial melting of the repair material, thereby effecting a brazed joint between the treatment area and the repair material.

In another exemplary embodiment, a method of brazing a treatment area of a load-bearing turbine component, including applying a repair material over the treatment area of the component and positioning an induction brazing coil having a geometry corresponding to the treatment area over the repair material and the treatment area. The method further includes heating the repair material utilizing the induction brazing coil to a temperature sufficient to cause at least partial melting of the repair material, thereby effecting a brazed joint between the treatment area and the repair material.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a method of brazing a treatment area of a load-bearing component, such as a turbine component for effecting repair of the component. The method includes utilizing an induction brazing coil that can be portable, the induction brazing coil covering the treatment area and a repair material applied over and/or into treatment area, effecting a brazed joint between the treatment area, thereby avoiding the need for a brazing furnace, saving expense and time.

The term "load-bearing" is intended to refer to a component or article that is designed to support a structural load applied to the component or article.

The term "electrical component" or "electrical equipment" and the like is intended to refer to apparatus, appliances, devices, wiring, fixtures, fittings, the material used as part of or in connection with an electrical installation. An electrical component or electrical equipment and the like is not a load-bearing component.

Figure 1:
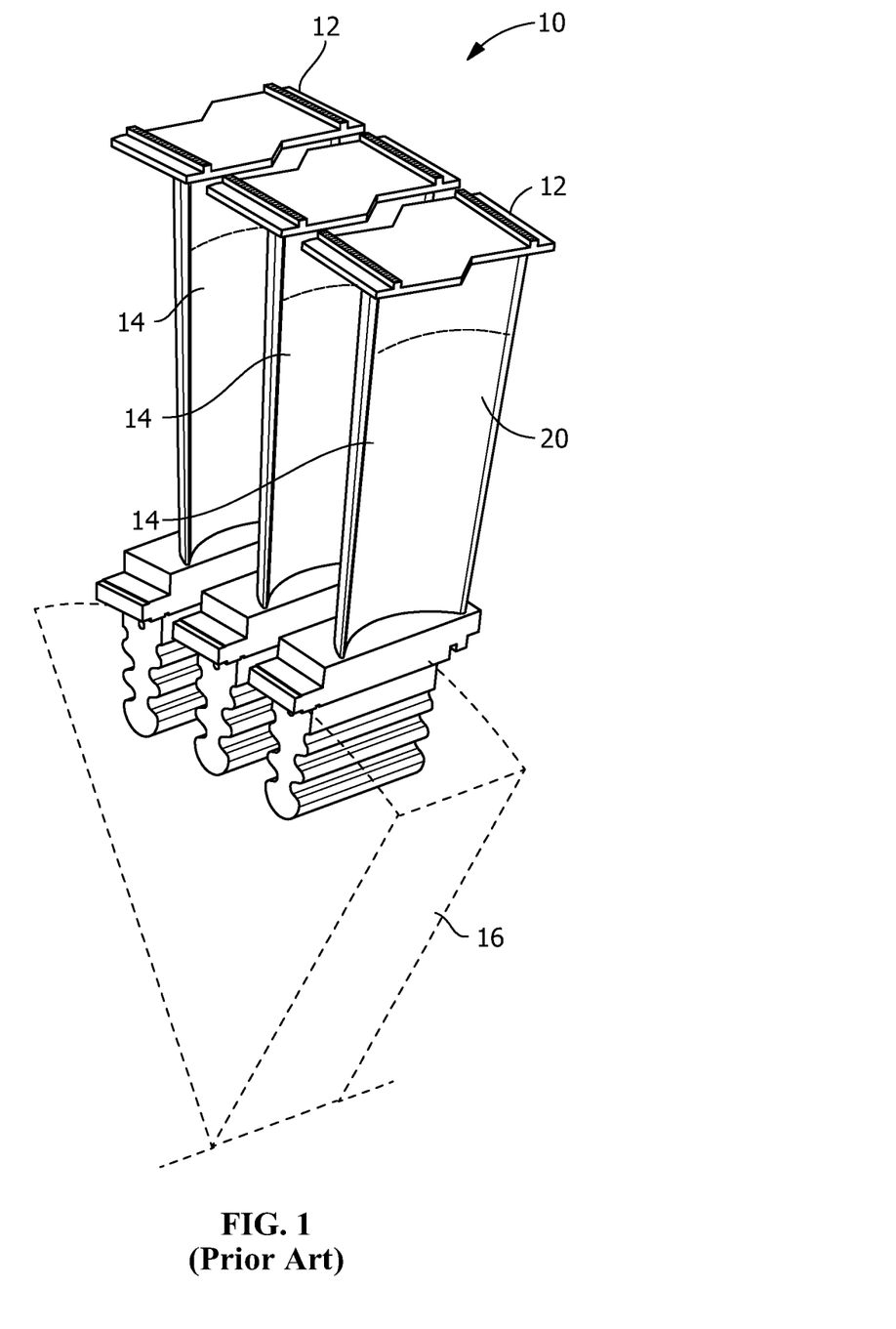
FIG. 1 is a perspective view of a portion of an exemplary turbine.
Figure 2:
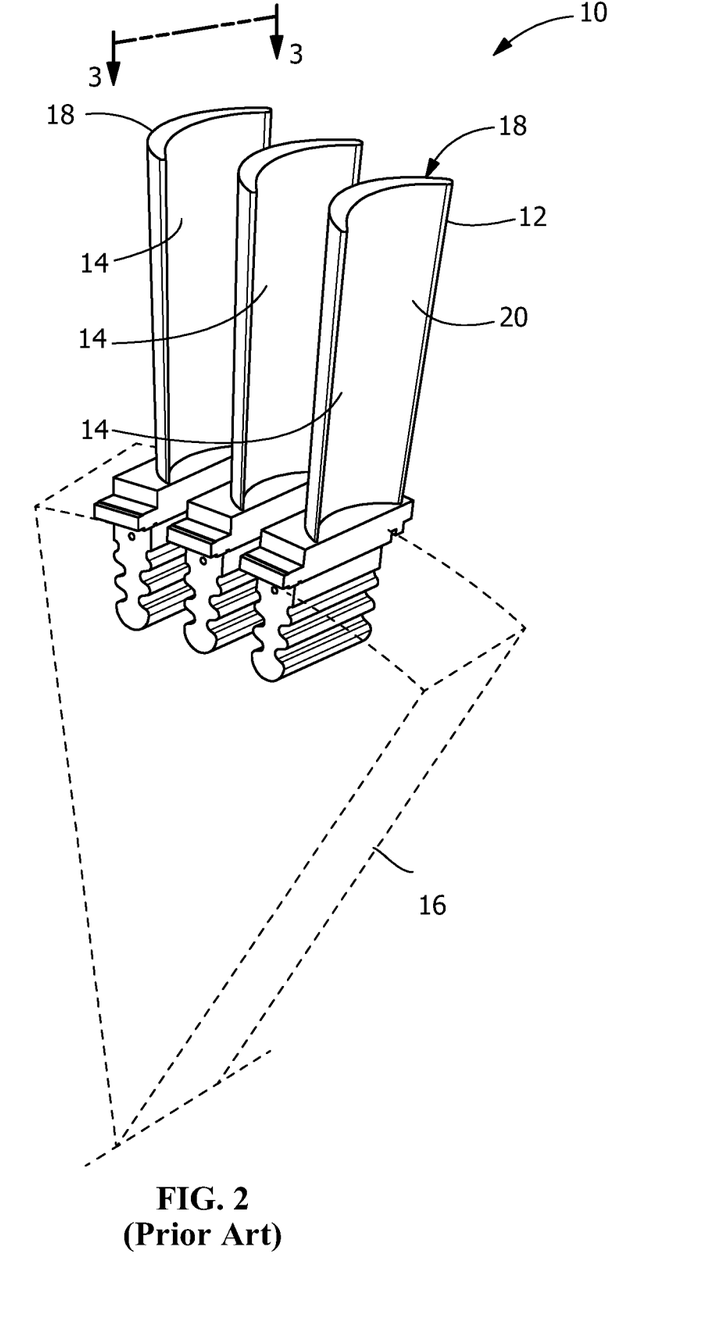
FIG. 2 is a perspective view of a portion of an exemplary turbine.

FIG. 1 is a perspective view of an exemplary turbine section 10. Turbine section 10 includes load-bearing components or articles 12. In some embodiments, the articles 12 are turbine shrouds (FIG. 1). As further shown in FIG. 1, turbine section 10 also includes blades 14 such as turbine shrouded blades coupled to a hub 16. In some embodiments, such as shown in FIG. 2, articles 12 include blades 14 having a recessed portions 18 at one end opposite hub 16, which recessed portions are commonly referred to as a "squealer tip". Blades 14 include corresponding airfoils 20 and the corresponding articles 12 are fixedly coupled to the airfoils 20. In other embodiments, components or articles 12, including super alloy hot gas path components for use in a gas turbine can be composed of nickel-based and cobalt-based alloys as well as stainless steels. For example, the components can be composed of FSX-414, MarM509, GTD111, Rene 108, GTD222, Inconel 718, Inconel 738, Hastelloy X, 308, 308L, 310, 304, 17-4PH and combinations thereof.

As used herein, "FSX 414" refers to an alloy including a composition, by weight, of about 29% chromium, about 7% tungsten, about 10% nickel, about 0.6% carbon, and a balance of cobalt.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD 222" refers to an alloy including a composition, by weight, of about 23.5% chromium, about 19% cobalt, about 2% tungsten, about 0.8% niobium, about 2.3% titanium, about 1.2% aluminum, about 1% tantalum, about 0.25% silicon, about 0.1% manganese, and a balance of nickel.

As used herein, "Hastelloy X" refers to an alloy including a composition, by weight, of about 22% chromium, about 18% iron, about 9% molybdenum, about 1.5% cobalt, about 0.1% carbon, about 0.6% tungsten, and a balance of nickel.

As used herein, "Inconel 718" refers to an alloy including a composition, by weight, of about 17% chromium, about 0.35 aluminum, about 2.80 molybdenum, about 0.65 titanium, about 4.75 niobium+tantalum, and a balance of nickel+cobalt (1% max of cobalt).

As used herein, "Inconel 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "MarM509" refers to an alloy including a composition, by weight, of about 24% chromium, about 10% nickel, about 7% tungsten, about 3.5% tantalum, about 0.5% zirconium, about 0.6% carbon, and a balance of cobalt.

As used herein, "Rene 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "304" refers to a stainless steel alloy including a composition, by weight, of about 19% chromium, 10% nickel, 2% manganese, 0.75% silicon, 0.045% phosphorus, 0.3% sulfur, 0.1% nitrogen, 0.08% carbon, and a balance of iron.

As used herein, "308" refers to a stainless steel alloy including a composition, by weight, of about 20% chromium, 11% nickel, 2% manganese, 1% silicon, at least 0.08% carbon, at least 0.045% phosphorus, 0.03% sulfur, and a balance of iron.

As used herein, "308L" refers to a stainless steel alloy including a composition, by weight, of about 20% chromium, 11% nickel, 2% manganese, 1% silicon, at least 0.03% carbon, at least 0.045% phosphorus, 0.03% sulfur, and a balance of iron.

As used herein, "310" refers to a stainless steel alloy including a composition, by weight, of about 25% chromium, 20% nickel, 2% manganese, 1.5% silicon, 0.45% phosphorus, 0.3% sulfur, and a balance of iron.

As used herein, "17-4PH" refers to a stainless steel alloy including a composition, by weight, of about 16% chromium, 4% nickel, 4% copper, 1% manganese, 1% silicon, 0.4% phosphorus, 0.3% sulfur, 0.7% carbon, 0.3% Columbium plus tantalum, and a balance of iron.

Figure 3:
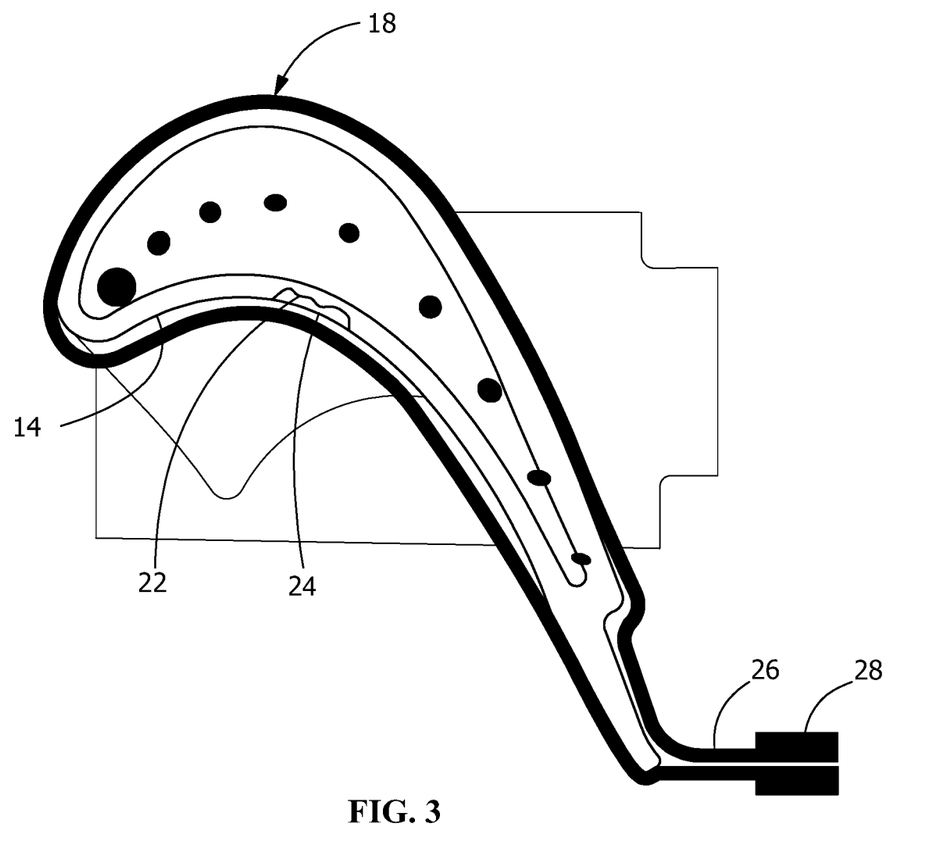
FIG. 3 is an end view of a turbine blade taken along line 3-3 of FIG. 2 with an exemplary induction coil for effecting repair of the turbine blade.

FIG. 3 is an end view of a squealer tip of blade 14 turbine blade taken along line 3-3 of FIG. 1 with which an induction coil 26 is to be used to effect a repair. As further shown in FIG. 3, the squealer tip includes a treatment area 22 over which is applied a repair material 24. Applying repair material 24 "into" or "onto" a treatment area 22 is intended to fall within the scope of applying material "over" treatment area 22. Repair material 24 is composed of a segmented insert, a one-piece insert, a plug, an overlay pre-sintered preform (PSP), a PSP chiclet, a flexible preform, a PSP foil, other suitable PSP structure, a flexible tape made from mixed braze powders, a paste made from the mixed braze powders, a dry mixture of the mixed braze powders, or a combination thereof. Once the repair material 24 is applied, an induction coil 26 is positioned over repair material 24 and treatment area 22. In one embodiment, induction coil 26 has a surface area between 10% and 50% larger than a surface area of treatment area 22. In one embodiment, induction coil 26 can have a surface area that is less than 10% larger than a surface area of treatment area 22. In one embodiment, induction coil can have a surface area that is greater than 50% larger than a surface area of treatment area 22. In one embodiment, induction coil 26 utilizes a 10 kW power supply 28. In one embodiment, induction coil 26 utilizes a power supply that is different from 10 kW. In one embodiment, the power supply operates between 40% to 80% maximum power for a predetermined time in order to elevate the temperature sufficient to cause at least partial melting of repair material 24, thereby effecting a brazed joint between the treatment area 22 and repair material 24. In other embodiments, the power supply may operate at different percentages of maximum power of the power supply, i.e., less than 40% and/or greater than 80% maximum power, for effecting a brazed joint between treatment area 22 and repair material 24, depending upon the component being repaired.

The article 12, the repair material 24, and/or layers forming the repair material 24 include any combination of compositions selected from the embodiments disclosed below.

In one embodiment, the repair material 24 has a composition, by weight, of about 12% to about 20% Pd, about 0.1% to about 5% B/Si, about 2% to about 16% Al, about 7% to about 15% Cr, a balance of Ni, and incidental impurities.

In one embodiment, the repair material 24 has a composition, by weight, of about 12% to about 20% Pd, about 0.1% to about 5% B/Si, about 2% to about 16% Al, about 7% to about 15% Cr, about 3% to about 10% Ti, a balance of Ni, and incidental impurities.

In one embodiment, the repair material 24 has a composition, by weight, of about 12% to about 20% Pd, about 0.1% to about 5% B/Si, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the repair material 24 has a composition, by weight, of about 12% to about 20% Pd, about 0.1% to about 5% B/Si, about 2% to about 16% Al, about 7% to about 15% Cr, about 3% to about 10% Ti, about 1% to about 15% Co, balance of Ni.

In one embodiment, the repair material 24 has a composition, by weight, of about 12% to about 20% Pd, about 0.1% to about 2% B, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the repair material 24 has a composition, by weight, of about 12% to about 20% Pd, about 2% to about 5% Si, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the repair material 24 has a composition, by weight, of about 10% to about 15% Pd, about 3% to about 5% Si, about 15% to about 28% Ti, about 10% to about 18% Zr, a balance of Ni, and incidental impurities.

In one embodiment, the repair material 24 has a composition, by weight, of about 12% to about 20% Pd, about 0.1% to about 5% B/Si, about 2% to about 16% Al, about 7% to about 15% Cr, about 0.5% to about 2.5% Ta, a balance of Ni, and incidental impurities.

In one embodiment, the repair material 24 has a composition, by weight, of about 6.4% Al, about 9.3% Co, about 15.6% Cr, about 0.9% Mo, about 1.0% Ta, about 6% Ti, about 1.3% W, about 0.5% C, a balance of Ni, and incidental impurities.

In one embodiment, the repair material 24 has a composition, by weight, of about 0.15% to about 0.19% C, about 13.7% to about 14.3% Cr, about 9.0% to about 10.0% Co, about 4.8% to about 5.2% Ti, about 2.8% to about 3.2% Al, about 3.7% to about 4.3% W, about 3.7% to about 4.3% Mo (with about 7.7% minimum W and Mo combined), a balance of Ni.

In one embodiment, the repair material 24 has a composition, by weight, of up to between about 0.02% to about 0.05% C (or more specifically 0% C), between about 8% and about 23% Cr (or more specifically between about 14.8% and about 15.8% Cr or at about 15.3% Cr), between about 4% and about 18% Co (or more specifically, between about 9.5% and about 11.0% Co or at about 10.25% Co), between about 1.5% and about 6.0% Ta (or more specifically, between about 3.0% and about 3.8% Ta or at about 3.4% Ta), between about 1.0% and about 6.0% Al (or more specifically, between about 3.2% and about 3.7% Al or 3.45% Al), between about 0.3% and 1.5% B (or more specifically, between about 0.8 and about 1.2% B or 1.0% B), between about 2.0% and about 6.0% Si (or more specifically, between about 3.5% and about 4.1% Si or about 3.8% Si), a balance of Ni, and incidental impurities.

In one embodiment, the repair material 24 has a composition, by weight, of between about 11.45% and about 12.05% Co, between about 6.6% and about 7.0% Cr, between about 5.94% and about 6.3% Al, between about 1.3% and about 1.7% Mo, between about 4.7% and about 5.0% W, between about 6.2% and about 6.5% Ta, between about 2.6% and about 3.0% Re, between about 1.3% and about 1.7% Hf, between about 0.10% and about 0.14% C, up to about 0.02% Ti, a balance of Ni, and incidental impurities.

In one embodiment, the repair material 24 has a composition, by weight, of between about 0.13% and about 0.19% C, between about 13.7% and about 14.3% Cr, between about 9.0% and about 10.0% Co, between about 4.6% and about 5.2% Ti, between about 2.8% and about 3.2% Al, between about 0.5% and about 0.8% B, between about 4.2% and about 4.8% Si, a balance of Ni, and incidental impurities.

In one embodiment, the repair material 24 has a composition, by weight, of up to about 0.01% C, between about 18.5% and 19.5% Cr, up to about 0.03% B, between about 9.8% and about 10.3% Si, a balance of Ni, and incidental impurities.

In one embodiment, the repair material 24 has a composition, by weight, of between about 8% and about 23% Cr, between about 4% and about 18% Co, between about 1.5% and about 6.0% Ta, between about 1.0% and about 6.0% Al, between about 0.3% and about 1.5% B, between about 2.0% and about 6.0% Si, up to about 0.2% C, a balance of Ni, and incidental impurities.

In one embodiment, the repair material 24 has a composition, by weight, of between about 0.15% and about 0.19% C, between about 13.7% and about 14.3% Cr, between about 9.0% and about 10.0% Co, between about 4.8% and 5.2% Ti, between about 2.8% and about 3.2% Al, between about 3.7% and about 4.3% W, between about 3.7% and about 4.3% Mo (or more specifically, more than about 7.7% W and Mo combined), a balance Ni, and incidental impurities.

In one embodiment, the repair material 24 has a composition, by weight, of between about 0.10% and about 0.14% C, between about 6.6% and about 7.0% Cr, about 11.45% Co, up to about 0.2% Ti, between about 6.2% and about 6.5% Ta, between about 5.94% and about 6.3% Al, between about 4.7% and about 5.0% W, between about 1.3% and about 1.7% Mo, between about 1.3% and about 1.7% Hf, between about 2.6% and about 3.0% Re, a balance of Ni, and incidental impurities.

In one embodiment, the repair material 24 has a composition, by weight, of between about 0.01 and about 0.03% C, between about 7.4% and about 7.8% Cr, between about 2.9% and about 3.3% Co, between about 5.3% and about 5.6% Ta, between about 7.6% and about 8.0% Al, between about 3.7% and about 4.0% W, between about 0.01% and about 0.02% B, between about 0.12% and about 0.18% Hf, between about 1.5% and about 1.8% Re, between about 0.5% and about 0.6% Si, a balance of Ni, and incidental impurities.

In one embodiment, the repair material 24 has a composition, by weight, of up to about 0.05% C, between about 14.8% and about 15.8% Cr, between about 9.5% and about 11.0% Co, between about 3.0 and about 3.8% Ta, between about 3.2% and about 3.7% Al, between about 2.1% and about 2.5% B, a balance of Ni, and incidental impurities.

In one embodiment, the repair material 24 has a composition, by weight, of up to about 0.01% C, between about 18.5% and about 19.5% Cr, up to about 0.03% B, between about 9.8% and about 10.3% Si, a balance of Ni, and incidental impurities.

In one embodiment, the repair material 24 has a composition, by weight, of about 50.25% Ni, about 42% Fe, about 4.5% Si, about 3.25% B, and incidental impurities.

In one embodiment, the repair material 24 has a composition, by weight, of between about 15.0% and about 17.0% Mo, between about 14.5% and about 16.5% Cr, between about 4.0% and about 7.0% Fe, between about 3.0% and about 4.5% W, up to about 2.5% Co, a balance Ni, and incidental impurities.

In one embodiment, the repair material 24 has a composition, by weight, of between about 9% and about 11% Co, between about 7% and about 9% Cr, between about 9 and about 11% W, between about 2.5% and about 3.5% Ta, between about 5% and about 6% Al, between about 0.5% and about 1.5% Ti, between about 0.6% and about 0.8% Mo, between about 1.3% and about 1.7% Hf, between about 0.03% and about 0.08% Zr, between about 0.01% and about 0.02% B, between about 0.13% and about 0.17% C, a balance Ni, and incidental impurities.

In one embodiment, the repair material 24 has a composition, by weight, of between about 19% and about 21% Cr, between about 2.5% and about 3.5% Ta, between about 2.5% and about 3.5% B, between about 0.003% and about 0.005% Y, a balance of Ni, and incidental impurities.

In one embodiment, the repair material 24 has a composition, by weight, of about 0.1% C, about 22% Cr, about 9% Mo, about 0.5% W, about 1% Co, about 19% Fe, a balance Ni, and incidental impurities.

In one embodiment, the repair material 24 has a composition, by weight, of about 0.1% C, about 22% Cr, about 2% Mo, about 14% W, about 0.3% Al, about 0.5% Mn, about 0.4% Si, about 0.02% La, a balance Ni, and incidental impurities.

In one embodiment, the repair material 24 has a composition, by weight, of about 10% W, about 10% Co, about 8% Cr, about 5% Al, about 3% Ta, about 1% Hf, about 1% Ti, about 0.7% Mo, about 0.2% C, a balance of Ni, and incidental impurities.

In one embodiment, the repair material 24 has a composition, by weight, of between about 15.0% and 17.0% Mo, between about 14.5% and 16.5% Cr, between about 4.0% and about 7.0% Fe, between about 3.0% and about 4.5% W, up to about 2.5% Co, a balance Ni, and incidental impurities.

In one embodiment, the repair material 24 has a composition, by weight, of about 16% Cr, about 16.5% Mo, about 4% W, about 5.5% Fe, about 1% Co, a balance Ni, and incidental impurities.

In one embodiment, the repair material 24 has a composition, by weight, of between about 19% and about 21% Cr, between about 2.5% and about 3.5% Ta, between about 2.5% and about 3.5% B, between about 0.003% and about 0.005% Y, a balance Ni, and incidental impurities.

In one embodiment, the repair material 24 has a composition, by weight, of about 19.7% Cr, about 3.1% Ta, about 3.1% B, about 0.001% Y, a balance Ni, and incidental impurities.

The brazing temperature is any suitable temperature at or above which the repair material 24 is brazed to the treatment area. Suitable brazing temperatures include, but are not limited to, between about 1800° F. and about 2400° F., between about 2100° F. and about 2400° F., between about 2050° F. and about 2300° F. between about 2100° F. and about 2300° F., between about 2150° F. and about 2300° F., between about 2200° F. and about 2400° F., between about 2200° F. and about 2300° F., or any combination, sub-combination, range, or sub-range thereof.

The localized brazing cycle is any suitable duration, such as, but not limited to between about 1 minute and about 60 minutes, between about 5 minutes and about 30 minutes, between about 15 minutes and about 30 minutes, between about 20 minutes and about 40 minutes, about 10 minutes, about 15 minutes, about 20 minutes, about 30 minutes, or any suitable combination, sub-combination, range, or sub-range therein.

It is to be understood that heating cycles may be configured to optimize yielding and/or diffusion in the shortest amount of time, and are application-specific. That is, the induction coils, while typically operating at or utilizing similar temperatures and temperature ranges as used in furnace brazing, aspects such as hold times can be reduced or kept the same. Further, temperature ramp rates can also vary from furnace brazing.

Figure 4:
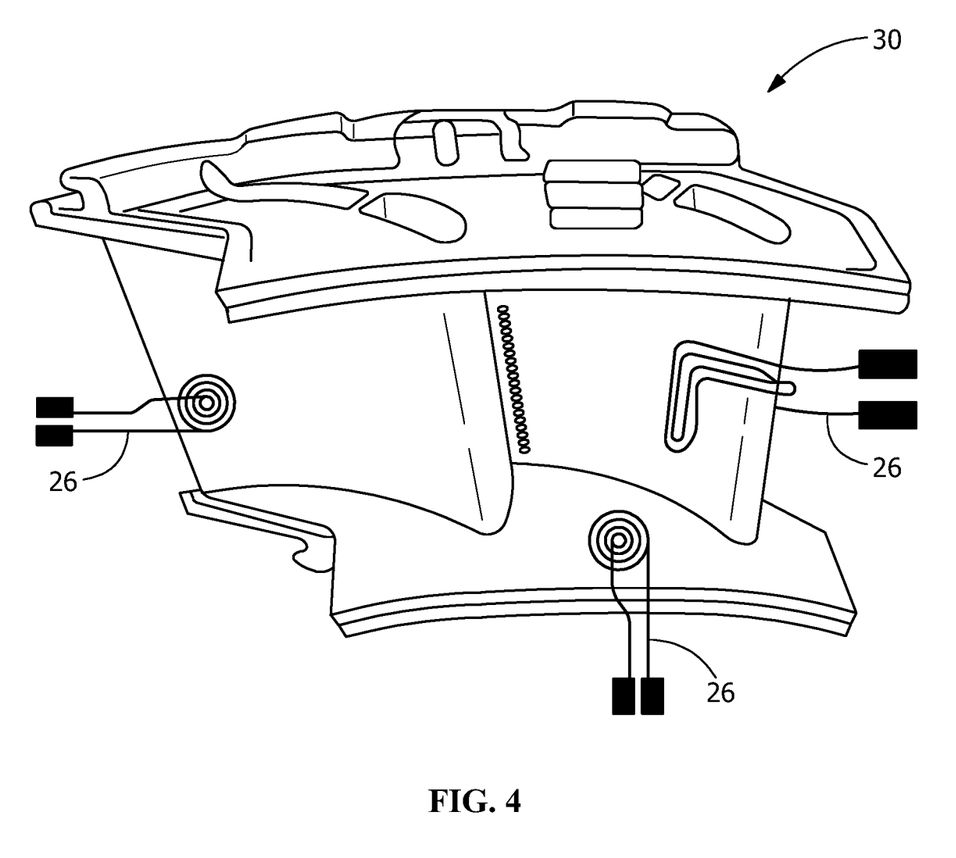
FIG. 4 is a perspective view of a nozzle with exemplary induction coils for effecting repair of different portions of the nozzle.
Figure 5:
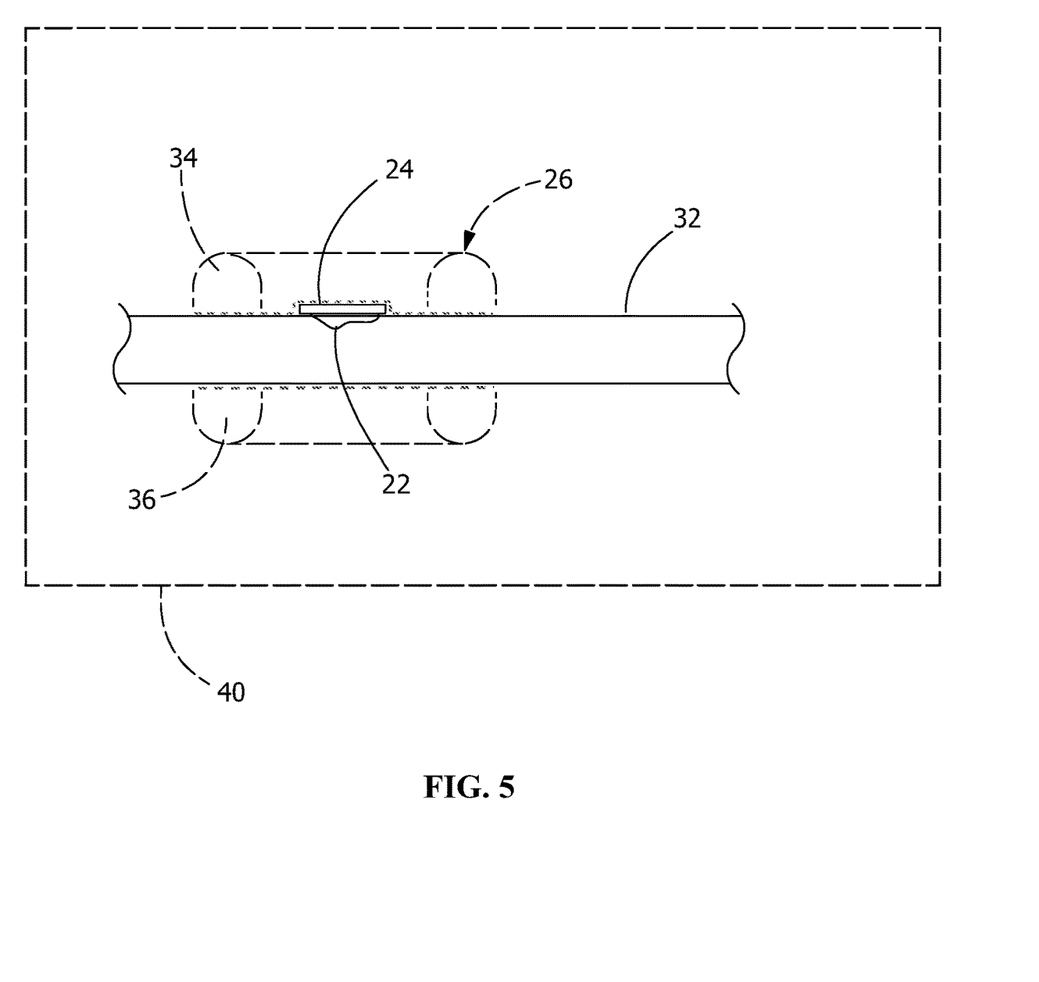
FIG. 5 is an elevation view of an exemplary induction coil for effecting repair of a component.

FIG. 4 is a perspective view of a nozzle 30 with exemplary induction coils 26 positioned at various locations on nozzle 30 for effecting brazed joint repairs of the corresponding different locations of the nozzle in a manner similar to that previously discussed. In other embodiments, such as shown in FIG. 5, other components 32, such as load-bearing components, including hot gas path components and turbine components can use induction coils 26 to effect a braze repair of the components. More specifically, induction coils 26 can be used on and have a geometry corresponding to a treatment area 22 of a surface of such components 32 including a shroud edge, a blade tip, such as a first or second stage blade squealer tip, a blade seal rail/cutter teeth, such as second, third or fourth stage blade seal rail/cutter teeth, a nozzle portion, a portion of a blade airfoil, a cast tip plug, blades, vanes, combustion liners, transition pieces, diaphragms, shrouds, fuel nozzles, pilot nozzles, gas diffusers, swirlers, nozzle hooks, diaphragm hooks, shroud hooks and a combination thereof. The surfaces of some of these components 32 may require specially configured inductor coil geometries. In one embodiment, at least a portion of induction coils 26 are flexible and can accommodate a number of component geometries. Optionally, as further shown in FIG. 5, induction coils 26 may include a pair of coils or coil sections 34, 36 in order to effect a repair. That is, coil or coil section 34 is positioned over repair material 24 that is applied over treatment area 22 of component 32, and coil or section 36 is positioned over a surface opposite treatment area 22. Alternately, such as shown in FIG. 3, induction coils 26 can surround treatment area 22.

In one embodiment, the component 32 is a gas turbine component, such as a turbine bucket having a bucket tip. For example, in one embodiment, a crack in the bucket tip of a stage 2 bucket on a series 9H General Electric gas turbine (9H S2) is repaired through brazing at the braze temperature provided by the localized heating source (not shown). The 9H S2 bucket tip is repaired using a mixture of 60% nickel-based superalloy (such as MarM 247) and 40% nickel brazing alloy (such as DF4B). The braze temperature is 2215° F. and is directed towards the repair material 24, brazing the repair material 24 to the 9H S2 bucket tip.

As further shown in FIG. 5, in one embodiment, in order to effect a brazed joint, treatment area 22 and repair material 24 may be required to be positioned in an inert atmosphere 38, in which case a fixture or container would surround the corresponding treatment area 22 and repair material 24.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of brazing a treatment area of a load-bearing component, comprising:
   applying a repair material over the treatment area of the component;
   positioning an induction brazing coil having a geometry corresponding to the treatment area over the repair material and the treatment area such that a treating portion of the induction brazing coil facing the treatment area overlays the entire treatment area at one time; and
   heating the repair material utilizing the induction brazing coil to a temperature sufficient to cause at least partial melting of the repair material, thereby effecting a brazed joint between the treatment area and the repair material.

2. The method of claim 1, wherein the component is a super alloy hot gas path turbine component.

3. The method of claim 2, wherein the treatment area comprises a surface of a component portion selected from the group consisting of a shroud edge, a blade tip, a blade seal rail/cutter teeth, a nozzle portion, a portion of a blade airfoil, a cast tip plug, blades, vanes, combustion liners, transition pieces, diaphragms, shrouds, fuel nozzles, pilot nozzles, gas diffusers, swirlers, nozzle hooks, diaphragm hooks, shroud hooks and a combination thereof.

4. The method of claim 2, wherein the repair material is composed of the group consisting of a segmented insert, a one-piece insert, a plug, an overlay pre-sintered preform (PSP), a PSP chiclet, a flexible preform, a PSP foil, other suitable PSP structure, a flexible tape made from mixed braze powders, a paste made from the mixed braze powders, a dry mixture of the mixed braze powders, or a combination thereof.

5. The method of claim 1, wherein the component is composed of the group of material consisting of FSX-414, MarM509, GTD111, Rene 108, GTD222, Inconel 718, Inconel 738, Hastelloy X, 308, 308L, 310, 304, 17-4PH, and combinations thereof.

6. The method of claim 1, wherein heating the repair material includes utilizing a 10 kW power supply for the induction brazing coil, the power supply operating between 40% to 80% maximum power.

7. The method of claim 1, wherein positioning the induction brazing coil over the repair material and the treatment area includes simultaneously positioning a first section of the induction brazing coil over the repair material and a second section of the induction brazing coil over a surface opposite the treatment area or surrounding the treatment area.

8. The method of claim 1, wherein positioning the induction brazing coil over the repair material and the treatment area includes positioning the induction brazing coil such that the portion of the induction brazing coil facing the treatment area has a surface area between 10% and 50% larger than a surface area of the treatment area.

9. The method of claim 1, wherein positioning the induction brazing coil over the repair material and the treatment area includes positioning at least the repair material and the treatment area in an inert atmosphere.

10. The method of claim 1, wherein at least a flexible portion of the induction brazing coil is flexible.

11. The method of claim 1, wherein positioning the induction brazing coil over the repair material and the treatment area includes simultaneously positioning a first induction brazing coil over the repair material and the treatment area and a second induction brazing coil over a surface opposite the treatment area or surrounding the treatment area.

12. A method of brazing a treatment area of a load-bearing component, comprising:
applying a repair material over the treatment area of the component;
positioning an induction brazing coil having a geometry corresponding to the treatment area over the repair material and the treatment area such that the induction brazing coil surrounds a cross-section of the load-bearing component including the treatment area and overlays the entire treatment area at one time; and
heating the repair material utilizing the induction brazing coil to a temperature sufficient to cause at least partial melting of the repair material, thereby effecting a brazed joint between the treatment area and the repair material.

13. The method of claim 12, wherein the component is composed of the group of material consisting of FSX-414, MarM509, GTD111, Rene 108, GTD222, Inconel 718, Inconel 738, Hastelloy X, 308, 308L, 310, 304, 17-4PH, and combinations thereof.

14. The method of claim 12, wherein the repair material is composed of the group consisting of a segmented insert, a one-piece insert, a plug, an overlay pre-sintered preform (PSP), a PSP chiclet, a flexible preform, a PSP foil, other suitable PSP structure, a flexible tape made from mixed braze powders, a paste made from the mixed braze powders, a dry mixture of the mixed braze powders, or a combination thereof.

15. The method of claim 12, wherein positioning the induction brazing coil over the repair material and the treatment area includes positioning the induction brazing coil having a surface area between 10% and 50% larger than a surface area of the treatment area.

16. The method of claim 12, wherein the component is a super alloy hot gas path turbine component.

17. The method of claim 16, wherein the treatment area is a surface of a component portion selected from the group consisting of a shroud edge, a blade tip, a blade seal rail/cutter teeth, a nozzle portion, a portion of a blade airfoil, a cast tip plug, blades, vanes, combustion liners, transition pieces, diaphragms, shrouds, fuel nozzles, pilot nozzles, gas diffusers, swirlers, nozzle hooks, diaphragm hooks, shroud hooks and a combination thereof.

18. The method of claim 12, wherein heating the repair material includes utilizing a 10 kW power supply for the induction brazing coil, the power supply operating between 40% to 80% maximum power.

19. The method of claim 12, wherein positioning the induction brazing coil over the repair material and the treatment area includes positioning at least the repair material and the treatment area in an inert atmosphere.

20. The method of claim 12, wherein at least a portion of the induction brazing coil is flexible.

* * * * *